United States Patent
Colton et al.

(10) Patent No.: US 9,798,524 B1
(45) Date of Patent: Oct. 24, 2017

(54) SYSTEM AND METHOD FOR EXPOSING THE DYNAMIC WEB SERVER-SIDE

(71) Applicant: Appcelerator, Inc., Mountain View, CA (US)

(72) Inventors: Paul Colton, Palo Alto, CA (US); Uri Sarid, Oakland, CA (US); Kevin Edward Lindsey, Fort Worth, TX (US); Jeffrey George Haynie, Mountain View, CA (US); Matthew David Langston, Sunnyvale, CA (US)

(73) Assignee: Axway, Inc., Phoenix, AZ (US)

( * ) Notice: Subject to any disclaimer, the term of this patent is extended or adjusted under 35 U.S.C. 154(b) by 107 days.

(21) Appl. No.: 14/016,648

(22) Filed: Sep. 3, 2013

Related U.S. Application Data

(63) Continuation-in-part of application No. 12/326,110, filed on Dec. 2, 2008, now Pat. No. 8,527,860.

(60) Provisional application No. 60/992,098, filed on Dec. 4, 2007.

(51) Int. Cl.
- *G06F 17/22* (2006.01)
- *G06F 9/44* (2006.01)
- *G06F 17/24* (2006.01)
- *G06F 9/54* (2006.01)

(52) U.S. Cl.
CPC ............... *G06F 8/31* (2013.01); *G06F 9/541* (2013.01); *G06F 17/24* (2013.01)

(58) Field of Classification Search
CPC .................................. G06F 8/31; G06F 9/541
See application file for complete search history.

(56) References Cited

U.S. PATENT DOCUMENTS

| | | | | |
|---|---|---|---|---|
| 6,110,226 A * | 8/2000 | Bothner | .................... | G06F 8/44 717/153 |
| 6,185,609 B1 * | 2/2001 | Rangarajan et al. | ......... | 709/219 |
| 6,260,077 B1 * | 7/2001 | Rangarajan et al. | ......... | 719/328 |
| 6,968,539 B1 * | 11/2005 | Huang et al. | .................. | 717/115 |
| 7,242,929 B2 * | 7/2007 | Draluk | ....................... | G06F 8/60 455/418 |
| 7,743,384 B2 * | 6/2010 | Cabillic et al. | ............... | 718/108 |
| 7,752,610 B2 * | 7/2010 | Cabillic et al. | ............... | 717/148 |
| 8,285,813 B1 * | 10/2012 | Colton et al. | ................. | 709/217 |
| 8,335,982 B1 * | 12/2012 | Colton et al. | ................. | 715/234 |
| 8,418,165 B2 * | 4/2013 | Hoff | .......................... | G06F 8/61 717/110 |
| 8,533,672 B2 * | 9/2013 | Sikka | ....................... | G06F 8/42 717/106 |
| 8,561,038 B1 * | 10/2013 | Sams | ....................... | G06F 8/30 717/107 |
| 8,695,021 B2 * | 4/2014 | Pierson et al. | ................ | 719/328 |
| 8,863,115 B2 * | 10/2014 | Sikka | ....................... | G06F 8/31 717/175 |
| 8,959,495 B2 * | 2/2015 | Chafi | ...................... | G06F 8/443 717/140 |
| 8,963,929 B2 * | 2/2015 | Kuroda et al. | ................ | 345/473 |
| 9,063,765 B2 * | 6/2015 | Fallows | ............. | G06F 9/45516 |
| 9,069,735 B2 * | 6/2015 | Bourke | ............ | G06F 17/30893 |

(Continued)

*Primary Examiner* — Maikhanh Nguyen
(74) *Attorney, Agent, or Firm* — Staniford Tomita LLP

(57) ABSTRACT

A system and method for accessing a native platform API is disclosed herein. The method includes serving the application code as a container on the server-side and instantiating a content of the code with a plurality of JavaScript calls, which allows APIs to access and retrieve information from the code and to process the content of the code.

5 Claims, 13 Drawing Sheets

(56) References Cited

U.S. PATENT DOCUMENTS

| | | | |
|---|---|---|---|
| 9,122,794 B2* | 9/2015 | Smiljanic | G06F 11/3664 |
| 9,164,783 B2* | 10/2015 | Stoodley | G06F 9/45516 |
| 9,430,200 B1* | 8/2016 | Trofin | G06F 8/443 |
| 2003/0126311 A1* | 7/2003 | Kushnirskiy et al. | 709/328 |
| 2005/0028155 A1* | 2/2005 | Jung | G06F 8/52 718/1 |
| 2007/0192818 A1* | 8/2007 | Bourges-Sevenier et al. | 725/132 |
| 2007/0234325 A1* | 10/2007 | Bobrovsky | G06F 9/45516 717/151 |
| 2007/0294679 A1* | 12/2007 | Bobrovsky | G06F 9/45516 717/146 |
| 2008/0127057 A1* | 5/2008 | Costa | G06F 8/34 717/106 |
| 2009/0241094 A1* | 9/2009 | Sikka | G06F 8/31 717/127 |
| 2010/0306735 A1* | 12/2010 | Hoff | G06F 8/61 717/109 |
| 2011/0093527 A1* | 4/2011 | Doyle | G06F 9/45508 709/203 |
| 2011/0314389 A1* | 12/2011 | Meredith | G06F 8/60 715/751 |
| 2012/0236007 A1* | 9/2012 | Kuroda et al. | 345/473 |
| 2013/0055292 A1* | 2/2013 | Pierson et al. | 719/328 |
| 2013/0185626 A1* | 7/2013 | Jang | G06F 9/45516 715/234 |
| 2013/0263086 A1* | 10/2013 | Carter | G06F 8/33 717/113 |
| 2014/0047517 A1* | 2/2014 | Ding | H04L 12/1453 726/5 |
| 2014/0082597 A1* | 3/2014 | Chafi | G06F 8/443 717/148 |
| 2014/0136945 A1* | 5/2014 | Ligman | G06F 17/2247 715/234 |
| 2014/0136954 A1* | 5/2014 | Ligman | G06F 17/2247 715/234 |

\* cited by examiner

SYSTEM AND METHOD FOR EXPOSING THE DYNAMIC WEB SERVER-SIDE

CROSS REFERENCE TO RELATED APPLICATION

This Application is a continuation-in-part (CIP) of U.S. patent application Ser. No. 12/326,110 filed Dec. 2, 2008 which is now U.S. Pat. No. 8,527,860 which claims priority to U.S. Provisional Patent Application No. 60/992,098, filed on Dec. 4, 2007. U.S. patent application Ser. Nos. 12/326,110 and 60/992,098 are hereby incorporated by reference in their entirety.

BACKGROUND OF THE INVENTION

Field of the Invention

The present invention is related to development of Web-sites and Web-applications. More specifically, the present invention relates to server-side access to the dynamic Web.

Description of the Related Art

The online experience of Internet users is important to Web-site owners. Internet users expect Web-sites and Web-based applications to work properly, to be highly responsive, and to load quickly in the user's browser. Slow responding Web-pages often lead to searching for other Web-sites that are faster, more responsive and work correctly.

Prior to Rich Internet Applications, traditional Web applications involved a client-server architecture with all of the processing on the server side and the client-side used to display the HTML web-pages served by the server. Each time a user desired to view a new Web-page, a HTTP request was sent to the server and the requested Web-page was served to the Web browser on the client-side. Such a traditional system is shown in FIG. 1 with a Web-server 1000 on a server side receiving requests over the Internet 1005 from a Web-browser 1003 on a client-side.

Rich Internet Applications, such as Ajax, greatly improved on the traditional client-server architecture by allowing the client machine to dynamically render and partially refresh web pages based on an initial set of instructions from the server, user input, and small amounts of subsequent data dynamically requested from the server. As shown in FIG. 2, the client machine processes Ajax instructions to render a Web page for the user.

Early Web applications allowed a user's browser to send a request to a server. The server processed the request and responded to the browser with a Web page. When the user wanted to view a new page, another request was sent to the server and the server responded to the browser with a new Web page. Such a process resulted in a waste of bandwidth since much of the Web contents in the first Web page were also contained in the second web page. The need to resend the same information led to a much slower user interface of a Web application than that of a native application.

An emerging technology, called Ajax (Asynchronous and JavaScript XML), was developed for refreshing part of a page instead of refreshing the whole page on every interaction between the user and application. In an Ajax application, when a user submits a form in a page, a script program, usually a JavaScript program, resident on the Web browser receives the user's request and sends a XML (Extended Markup Language) HTTP (Hyper Text Transfer Protocol) request to the Web server in background so as to retrieve only the needed Web contents instead of the whole page and perform corresponding processing to partly refresh the page when receiving a response from the Web server. In this way, the application response time is shortened, because the amount of data exchanged between the Web browser and the Web server is greatly reduced. And the processing time of the Web server is saved because much of the processing is performed at the client side.

General definitions for terms utilized in the pertinent art are set forth below.

Ajax is the use of dynamic HTML, JavaScript and CSS to create dynamic and usually interactive Web sites and applications. A more detailed explanation of Ajax is set forth in Edmond Woychowsky, *AJAX, Creating Web Pages with Asynchronous JavaScript and XML*, Prentice Hall, 2007, which is hereby incorporated by reference in its entirety.

Applets or Java Applets are mini-executable programs named with the .class suffix and are placed on a Web page and provide interactive and multimedia uses.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

Aspect Oriented Programming ("AOP") is a software programming paradigm that increases modularity through breaking down a program into cross-cutting concerns. AOP introduces aspects which encapsulate behaviors that affect multiple classes into reusable modules.

An Attribute provides additional information about an element, object or file. In a Document Object Model, an attribute, or attribute node, is contained within an element node.

Behavioral layer is the top layer and is the scripting and programming that adds interactivity and dynamic effects to a site.

Binding in a general sense is the linking of a library to an application program usually to prevent repetition of frequently utilized code.

Cascading Style Sheets (CSS) is a W3C standard for defining the presentation of Web documents.

Compiler is a computer program that translates a series of instructions written in one computer language into a resulting output in a different computer language.

Document Object Model (DOM) Element is an object contained in a Document Object Model (DOM). The term DOM is generally used to refer to the particular DOM held in the memory region being used by the Web browser. Such a DOM controls the Graphical Respondent Interface (GRI) or Graphical User Interface (GUI). The DOM is generated according to the information that the Web browser reads from the HTML file, and/or from direct JavaScript software instructions. Generally, there exists a unique DOM element for every unique HTML element. DOM elements are sometimes referred to as HTML/DOM elements, because the DOM element exists only because HTML code that was read by the Web browser listed some HTML element that had not previously existed, and thereby caused the Web browser to create that DOM element. Often specific elements of the greater set of HTML/DOM elements are identified by specifying an HTML/DOM checkbox element, or an HTML/DOM text input element. A more detailed explanation of the document object model is set forth in Jeremy Keith, *DOM Scripting, Web Design with JavaScript and the Document Object Model*, friends of, 2005, which is hereby incorporated by reference in its entirety.

HyperText Markup Language (HTML) is a method of mixing text and other content with layout and appearance commands in a text file, so that a browser can generate a displayed image from the file.

Hypertext Transfer Protocol (HTTP) is a set of conventions for controlling the transfer of information via the Internet from a Web server computer to a client computer, and also from a client computer to a Web server.

Internet is the worldwide, decentralized totality of server computers and data-transmission paths which can supply information to a connected and browser-equipped client computer, and can receive and forward information entered from the client computer.

JavaScript is an object-based programming language. JavaScript is an interpreted language, not a compiled language. JavaScript is generally designed for writing software routines that operate within a client computer on the Internet. Generally, the software routines are downloaded to the client computer at the beginning of the interactive session, if they are not already cached on the client computer. JavaScript is discussed in greater detail below.

JSON is JavaScript Object Notation format, which is a way of taking data and turning it into valid JavaScript syntax for reconstituting an object at the other end of the transmission protocol.

MySQL is a relational database management system which relies on SQL for processing data in a database.

Parser is a component of a compiler that analyzes a sequence of tokens to determine its grammatical structure with respect to a given formal grammer. Parsing transforms input text into a data structure, usually a tree, which is suitable for later processing and which captures the implied hierarchy of the input. XML Parsers ensure that an XML document follows the rules of XML markup syntax correctly.

PHP is a scripting language that allows developers create dynamically generated Web pages, and is used for server-side programming.

Platform is the combination of a computer's architecture, operating system, programming language (PHP, JAVA, RUBY ON RAILS), runtime libraries and GUIs.

Presentation layer follows the structural layer, and provides instructions on how the document should look on the screen, sound when read aloud or be formatted when it is printed.

Rendering engine is software used with a Web browser that takes Web content (HTML, XML, image files) and formatting information (CSS, XSL) and displays the formatted content on a screen.

Serialization places an object in a binary form for transmission across a network such as the Internet and deserialization involves extracting a data structure from a series of bytes.

SQL (Structured Query Language) is a computer language designed for data retrieval and data management in a database.

Structural layer of a Web page is the marked up document and foundation on which other layers may be applied.

User is a client computer, generally operated by a human being, but in some system contexts running an automated process not under full-time human control.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access. Servers usually contain one or more processors (CPUs), memories, storage devices and network interface cards. Servers typically store the HTML documents and/or execute code that generates Web-pages that are sent to clients upon request. An interactive-form information-collection process generally is controlled from a server computer, to which the sponsor of the process has access.

World Wide Web Consortium (W3C) is an unofficial standards body which creates and oversees the development of web technologies and the application of those technologies.

XHTML (Extensible Hypertext Markup Language) is a language for describing the content of hypertext documents intended to be viewed or read in a browser.

XML (Extensible Markup Language) is a W3C standard for text document markup, and it is not a language but a set of rules for creating other markup languages.

There are three types of JavaScript: 1) Client-side JavaScript; 2) Server-side JavaScript; and 3) Core JavaScript. Client-side JavaScript is generally an extended version of JavaScript that enables the enhancement and manipulation of web pages and client browsers. Server-side JavaScript is an extended version of JavaScript that enables back-end access to databases, file systems, and servers. Core JavaScript is the base JavaScript.

Core JavaScript includes the following objects: array, date, math, number and string. Client-side JavaScript and Server-side JavaScript have additional objects and functions that are specific to client-side or server-side functionality. Generally, any JavaScript libraries (.js files) created in core JavaScript can be used on both the client and the server without changes. Client-side JavaScript is composed of a Core JavaScript and additional objects such as: document, form, frame and window. The objects in Client-side JavaScript enable manipulation of HTML documents (checking form fields, submitting forms, creating dynamic pages) and the browser (directing the browser to load other HTML pages, display messages). Server-side JavaScript is composed of Core JavaScript and additional objects and functions for accessing databases and file systems, and sending email. Server-side JavaScript enables Web developers to efficiently create database-driven web applications. Server-side JavaScript is generally used to create and customize server-based applications by scripting the interaction between objects. Client-side JavaScript may be served by any server but only displayed by JavaScript-enabled browsers. Server-side JavaScript must be served by a JavaScript-enabled server but can be displayed by any browser.

Dinovo, United States Patent Publication Number 20020069255 for a Dynamic Content Delivery To Static Page In Non-Application Capable Environment discloses a system for incorporating dynamic content into a static page from a non-application capable server.

Mocket et al., United States Patent Publication Number 20010037359 for a System And Method For A Server-side Browser Including Markup Language Graphical User Interface, Dynamic Markup Language Rewriter Engine And Profile Engine describes a system and method for a server-side browser including markup language graphical user interface, dynamic markup language rewriter engine and profile engine. The system includes a user computer and a destination server computer separated by a server computer hosting a server-side browser (SSB). The SSB includes a markup language graphical user interface (MLGUI), a dynamic markup language rewriter engine (DMLRE) and a profiling engine (PE). The SSB may be configured as an intermediary infrastructure residing on the Internet providing customized information gathering for a user. The components of the SSB allow for controlling, brokering and distributing information more perfectly by controlling both browser functionality (on the client-side) and server functionality (on the destination site side) within a single point and without the necessity of incremental consents or integration of either side.

Lafer et al., U.S. Pat. No. 6,192,382, for Method And System For Web Site Construction Using HTML Fragment Caching discloses storing HTML fragments in a tag cache.

Buchthal et al., U.S. Pat. No. 7,308,648 for a Method, System, And Computer-Readable Medium For Filtering Harmful HTML In An Electronic Document, discloses parsing an HTML document into HTML elements and attributes and comparing these to a content library using a filter of an API to remove unknown HTML fragments.

Daugherty et al., United States Patent Publication Number 20020016828 for a Web Page Rendering Architecture discloses a system and method for caching function calls.

Lipton et al., United States Patent Publication Number 20070143672 for Partial Rendering Of Web Pages discloses updating a Web page without having to download the entire Web page, with some rendering instructions represented as HTML fragments.

Irassar et al., United States Patent Publication Number 20040250262, for Business To Business Event Communications discloses an event handling mechanism that allows communication of event information among providers and subscribers across a network using an event handling server.

Jennings et al., United States Patent Publication Number 20070073739 for a Data-Driven And Plug-In Defined Event Engine, discloses an event engine that enables application developers to define finite state machines for implementation via a data-driven approach using executable plug-ins.

Lindhorst et al., U.S. Pat. No. 6,981,215 for a System For Converting Event-Driven Code Into Serially Executed Code, discloses an event-driven server model that uses active server pages that appear to other files as objects with associated method and properties for developing Web pages.

Wilson, United States Patent Publication Number 20070240032, for a Method And System For Vertical Acquisition Of Data From HTML Tables discloses passing a HTML document's content from a table to a DOM interpreter and parsing selected data to a formatted data structure on a browser.

Monsour et al., United States Patent Publication Number 20050278641 for a JavaScript Calendar Application Delivered To A Web Browser, discloses a JavaScript application that generates HTML on-the-fly from within invisible frames and renders such HTML on a user's screen in visible frames.

Alderson, United States Patent Publication Number 20040201618 for Streaming Of Real-Time Data To A Browser disclose's means for sending real-time data to a browser in batches at a predetermined time by storing data in a queue either on the browser or server.

Dillon et al., U.S. Pat. No. 7,389,330 for a System And Method For Pre-Fetching Content In A Proxy Architecture discloses a system that uses an upstream proxy server in communication over a WAN with a downstream proxy server that communicates with a browser, which allows for pre-fetching of objects by the upstream proxy server over the Internet from a Web-server.

McCollum et al., U.S. Pat. No. 7,269,636 for a Method And Code Module For Adding Function To A Web Page discloses a means for adding function to a Web page on Web browser.

Collins et al., United States Patent Publication Number 20070027768 for a System And Method For Collection Of Advertising Usage Information discloses a HTML tag that is operative to request an instrumentation script from a script server, with the instrumentation script being operative to collect visitor event information on a Web-site.

Mechkov et al., United States Patent Publication Number 20070214239 for a Dynamically Updated Web Page discloses updating less than an entire Web page using an active server page authored using ASP.NET.

Abe et al., United States Patent Publication Number 20040268303 for a System, Method, And Computer Program Product For Generating A Web Application With Dynamic Content discloses a technique to use objects and Web contents dynamically generated on a server to generate a Web application model to support a change of a system.

However, current technologies that operate Server-side JavaScript fail to offer complete interactions which are the hallmark of rich web sites and applications. More and more of the world wide web is not available as in the HTML delivered by web servers. Rather than serving up a largely static DOM with a few JavaScript event handlers, rich web sites and applications are served as containers or skeletons, whose meaningful content is only instantiated on the browser via JavaScript and Ajax calls.

BRIEF SUMMARY OF THE INVENTION

The Present Invention overcomes the obstacles of the prior art. With the present invention, the web-page is treated as a dynamic page, just as a web-browser would treat it, so it will execute and faithfully reproduce the content that was meant for the user. The present invention offers multiple convenient APIs with which server-side software can access and therefore mine that information. Software can be written directly in JavaScript using the file, the database, and network capabilities of the present invention. Alternatively, the software is written in a different language (e.g. Java, .NET languages like C# or Visual Basic, etc.) or using different tools that hook into the APIs of the present invention.

The server of the present invention eliminates the complexity of using different technologies for client and server. With the present invention, developers can use a single set of technologies, the ones closest to their users: HTML, JavaScript, and CSS.

As always, the page the user will see starts on the server, but now this page can just be the same static page that was mocked up in the design phase. As a developer, you can designate some JavaScript to run on the server before the page is sent to the client, such as code that accesses a database to fill up a grid. One can also designate some of the JavaScript to remain on the server but be accessible from the client, such as code to update the database with new data from the client, or retrieve database data for refreshing the client. In this case, when the user interacts with the page to fire events, these events trigger client-side JavaScript that can directly call the functions designated to stay behind on the server.

The present invention enables a developer to use Ajax-style development end-to-end so a developer can even use the developer's favorite Ajax libraries for all of the development. This provides several key development benefits: the same code can prepare both the HTML DOM server side (for better perceived responsiveness) and modify it client-side (when the user changes the data or it's refreshed from the server); and using the same code on both the client and the sever, developers have fewer technologies to learn, and fewer parts of the application or site to maintain. With the present invention, code reuse between the client and server is fully realized, which is impossible, or virtually impossible, using the prior art.

The Present Invention overcomes the obstacles of the prior art by allowing for a complete interaction between JavaScript and DOM on the server side. The Present Invention is able to accomplish this by creating browser-like functions on the server-side. The Present Invention creates a new paradigm in which the server-side can accomplish browser functions including interpreting JavaScript, which opens up development opportunities. This allows a web developer to apply on a server side the same skills, paradigms, libraries and other tools which are used for the client-side of the web site of software application.

One aspect of the present invention is a method for accessing a rich web site application. The method includes retrieving a web-page of a rich web site application on a server-side. The method also includes serving the web-page as a container. The method also includes instantiating a content of the web-page on the server-side with a plurality of JavaScript calls or a plurality of AJAX calls. The method also includes providing a plurality of APIs for a server-side software to access and retrieve information of the HTML page. The method also includes accessing the content of the web-page with a server-side software of at least one of the plurality of APIs. The method also includes processing the content of the web-page.

The step of processing the content of the web-page preferably comprises indexing the content for a search. The step of processing the content of the web-page alternatively comprises identifying patterns of the content. The step of processing the content of the web-page alternatively comprises repurposing the content.

Another aspect of the present invention is a system for accessing a web-page of rich web site application. The system includes a web-page of a rich web site application and a JavaScript server architecture. The JavaScript architecture comprises a plurality of APIs, means for retrieving the web-page of the rich web site application, means for instantiating a content of the web-page with a plurality of JavaScript calls or a plurality of AJAX calls, means for accessing the content of the web-page with a server-side software of at least one of the plurality of APIs, and means for processing the content of the web-page.

Yet another aspect of the present invention is a computer program product for accessing a web-page of rich web site application. The computer program product includes a plurality of APIs, means for retrieving the web-page of the rich web site application, means for instantiating a content of the web-page with a plurality of JavaScript calls or a plurality of AJAX calls, means for accessing the content of the web-page with a server-side software of at least one of the plurality of APIs, and means for processing the content of the web-page.

The present invention parses and executes the Web-page as a browser would parse the web-page. The present invention is configured to execute all or part of the code on that page, load external resources or not, and call various external systems in the course of processing the Web-page. As a result, the present invention can faithfully analyze the load-producing traffic in real time, e.g. monitoring how many links to certain resources are really being sent, whether they are clustered in certain ways (e.g. per page, per application or site, per user, per session), how much overlap they contain, and where do they appear and how their content is being used. In addition to reporting all this data and presenting the data in various ways to the system operators, the present invention effects certain optimizations. For example, the present invention aggregates multiple JavaScript and CSS files into single files, caches them, and replaces the multiple links to the original files into single links to the new files, thus reducing the number of network trips needed to complete the Web-page. The present invention delivers only the pieces of code that are used often, and proxies the rest of the code to deliver them on demand. The present invention reassembles JavaScript files for more optimal caching on the client and fewer network trips, and present invention can do so for images too using a technique known as image sprites. Further the present invention does all of this without changing the original code and files used to generate the web-pages. The on-the-fly (runtime) information and optimizations are then used as actionable feedback to change the original code and files or for building new code and files better.

To understand the differences between the server and browser sides, it's important to keep in mind the page lifecycle. The page request from the browser is received by the Web server, which fetches the appropriate HTML document (either from the file system or perhaps from another "handler" such as PHP or Ruby or Java). The Web server (Apache server) then feeds the document to the script server of the present invention, which begins to parse the HTML document and builds up the DOM tree. When the script server encounters <script> tags the script server not only adds them to the DOM but may also execute them if they have a run at attribute that indicates they should run on the server. During the parsing and execution, external content may also be fetched and loaded into the document, via <script src=" . . . "></script> elements and Jaxer.load( . . . ) for JavaScript code, or via <jaxer:include src=" . . . "></jaxer:include> (or <jaxer:include path=" . . . "></jaxer:include>) for HTML content, or via XMLHttpRequests for any content. After the DOM is fully loaded, the onserverload event is fired. This is the server-side equivalent of the onload event on the browser. The onserverload event is named differently so that a developer's code can react separately to onserverload and onload events. The script server post-processes the DOM to carry out its built-in logic and prepare the DOM for sending to the browser: removing <script> blocks meant only for the server, replacing functions to be proxied with proxies, saving (as needed) functions that should be available on callbacks, . . . etc. Finally, the DOM is serialized back to HTML, and that HTML is streamed back via the Web server to the browser.

The resulting HTML page is sent back to the browser as the response to the browser's request. The browser begins to parse the HTML, building up the DOM. When the browser encounters <script> tags the browser not only adds them to the DOM but also executes them. External JavaScript code or any other content may also be loaded. The onload event fires. Of course the page is progressively rendered throughout much of this flow, and also the user can interact with it.

Callbacks from the browser to server-side functions are handled via XMLHttpRequests. When the script server receives such a request, it creates a new, empty document (unless configured to use a different static document). The script server retrieves the saved functions that are needed to be made available during callbacks to this page. If a function called oncallback is found, it is executed. This is usually used to create the environment needed during a callback, if the saved functions are not enough. The callback function itself is executed. Finally, the result of that execution is packaged and returned as the response to the XMLHttpRequest.

While a DOM is available during callback processing, it is not serialized as HTML and returned as the response, as it was during the "regular" (non-callback) page processing flow. The DOM on script server and the DOM on the browser typically are not synchronized. Both are created from the same HTML source, but they are often subject to processing by different JavaScript code, and both come to life at different points in the page lifecycle: the DOM on the script server exists temporarily when the page is processed by the script server, and is eliminated after it's been serialized into the HTML sent to the browser; the DOM in the browser is built, on the browser, from that HTML, and is the DOM that's rendered to the user and with which the end-user interacts.

While script server and the browser may well share some code (e.g. when using runat="both"), usually the JavaScript code designated to run on script server and interacting with the script server DOM is different than the code designated to run on the client. The latter exists e.g. as a <script> tag in the script server DOM but is not executed in script server.

Remember that the only things sent to the browser at the end of page processing is what's actually in the DOM, and what the script server of the present invention has added such as proxies, clientData, and injected scripts. For example, if a developer added an expando property, which is an in-memory change to the DOM that will not get serialized, it will not appear on the client side.

var div=document.createElement ("div");
div.id="myDiv";
document.body.appendChild(div);
document.getElementById("myDiv").userId=123;

On the browser the div is present, with an id of "myDiv", but without a "userId" property. For this same reason, setting event handlers programmatically rather than in the DOM will not translate to DOM changes and hence will not propagate to the browser. For example with a button: <input type="button" id="myButton" value="Click me">

A developer could add an onclick=" . . . " attribute to the tag, but this does not assist with adding the event handler programmatically. The script server of the present invention provides Jaxer.setEvent (domElement, eventName, handler) function that "does the right thing" in the script server as well as on the browser. var btn=document.getElementById ("myButton"); function sayHi( ) {alert ("hi")} sayHi.runat="client"; Jaxer.setEvent(btn, "onclick", sayHi);

The function used as the event handler should be made available to the browser. When setEvent is executed on the server, as above, it results in the following change to the myButton element: <input type="button" id="myButton" value="Click me" onclick="sayHi( )"> This is sent to the browser since it is a DOM change. If the function passed into setEvent has no name, its body (source) is used as the value of the attribute: var btn=document.getEleemntById("myButton"); Jaxer.setEvent(btn, "onclick", function( ){alert ("hi");});

This results in the following: <input type="button" id="myButton" value="Click me" onclick="(function( ) {alert(\"hi\");}) ( )">

Which is useful for short functions but is easier to pass in the code to execute as a string: var btn=document.getElementById("myButton");Jaxer.setEvent(btn, "onclick", "alert('hi')");

Which results in:<input type="button" id="myButton" value="Click me" onclick="alert('hi')">

The environment of the present invention is preferably based upon the very same Mozilla engine which powers Firefox 3. This means that, for the most part, DOM interaction in the server using the present invention is the same as interacting with the DOM in a Web browser. It parses and executes pages progressively, building up the DOM as it goes along, and allowing JavaScript to interact with whatever DOM has already been built up at the time the JavaScript executes. Any document.write( ) calls will write to the DOM immediately following the current location on the page. The JavaScript that is part of a page, and loaded into the page, executes within the context of the global window object. For each request at the server, the present invention preferably provides a document object model. This DOM (which we'll refer to as DOM1) can be used to insert data and otherwise transform the page before it is first returned to the browser. You interact with and manipulate the DOM much the same as you would in the browser. Some third party Javascript toolkits, such as iQuery, can also be used to modify this DOM. The document is accessible through the document object, and the root element of the DOM is accessible through the document.documentElement object. To ensure that element properties are serialized properly when the DOM is returned to the browser, use element.setAttribute("attr", "value") rather than element.foo="value". Form element values set with formElement.value [code font] are an exception; they'll still be serialized as expected. To attach an event handler to an element, preferably use the special Jaxer method Jaxer.setEvent( ). Example: Transforming the DOM.

<script type="text/javascript" runat="server">
  window.onserverload=funcfion( ) {
    var textNode=document.createTextNode("wocka wocka wocka");
    var element=document. getElementById("container");
    element.appendChild(textNode);
  };
</script>

A developer can manipulate the DOM in the API's, for example by using the following:

<script runat="server">
  Document.getElementById('useBillingAddrChkbox').checked=
  Jaxer.session.get('userSessionBillingAddrValue');
</script>

The present invention allows Web-developers to consume and transform content from HTML pages written in other languages like PHP, PYTHON, RUBY ON RAILS, .NET or JAVA. The present invention includes a rich framework for many useful tasks on the server, including accessing local or remote Web resources and services without cross-domain security restrictions that a browser might impose, or rewriting HTML pages generated by other platforms such as set forth below.

```
<script runat="server">
var data=Jaxer.Serialization.from JSONString(
    Jaxer.Web.get("pricingService.php?productId=7234"));
</script>
```

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
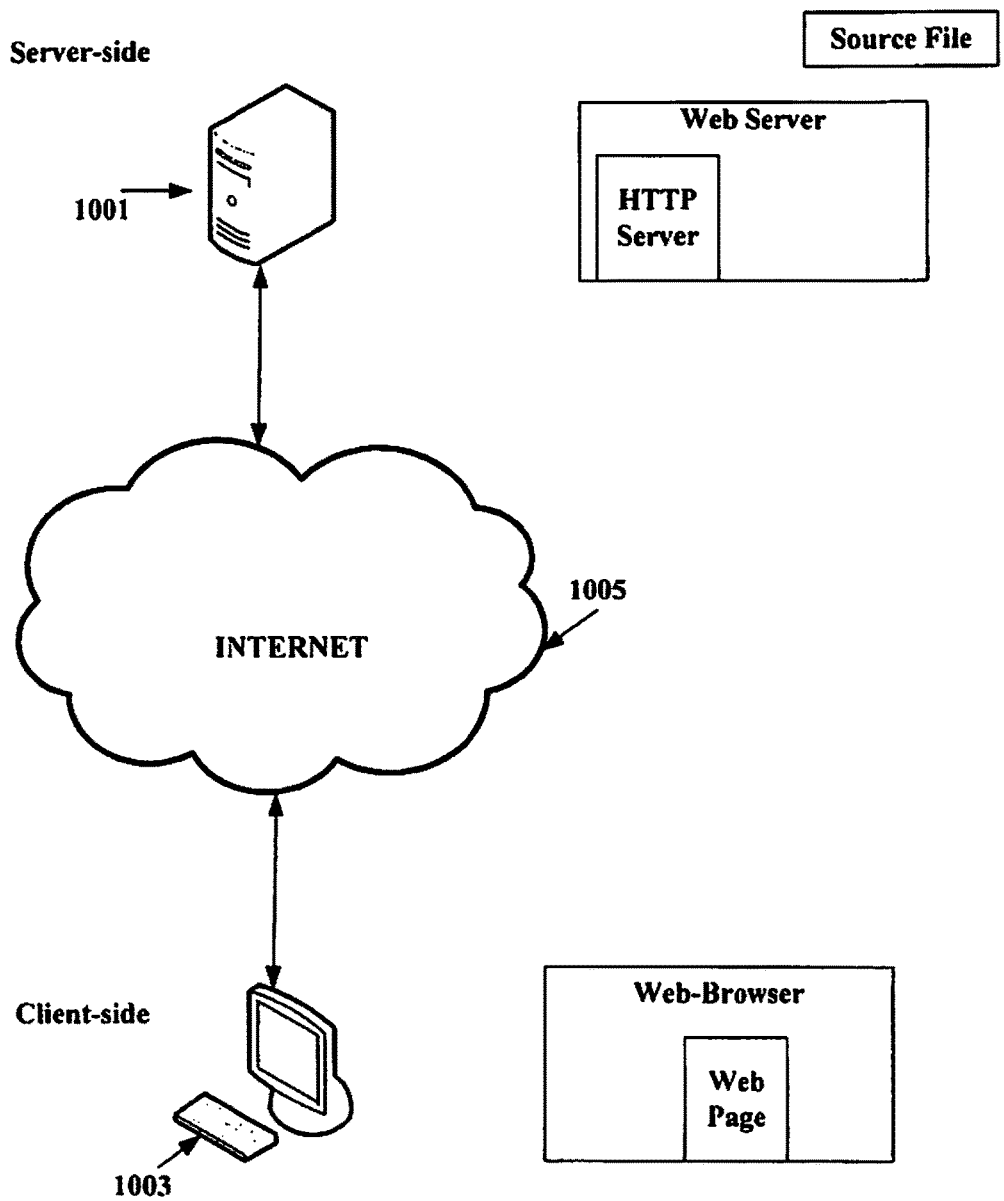
FIG. 1 is a block diagram of a web system of the prior art.
Figure 2:
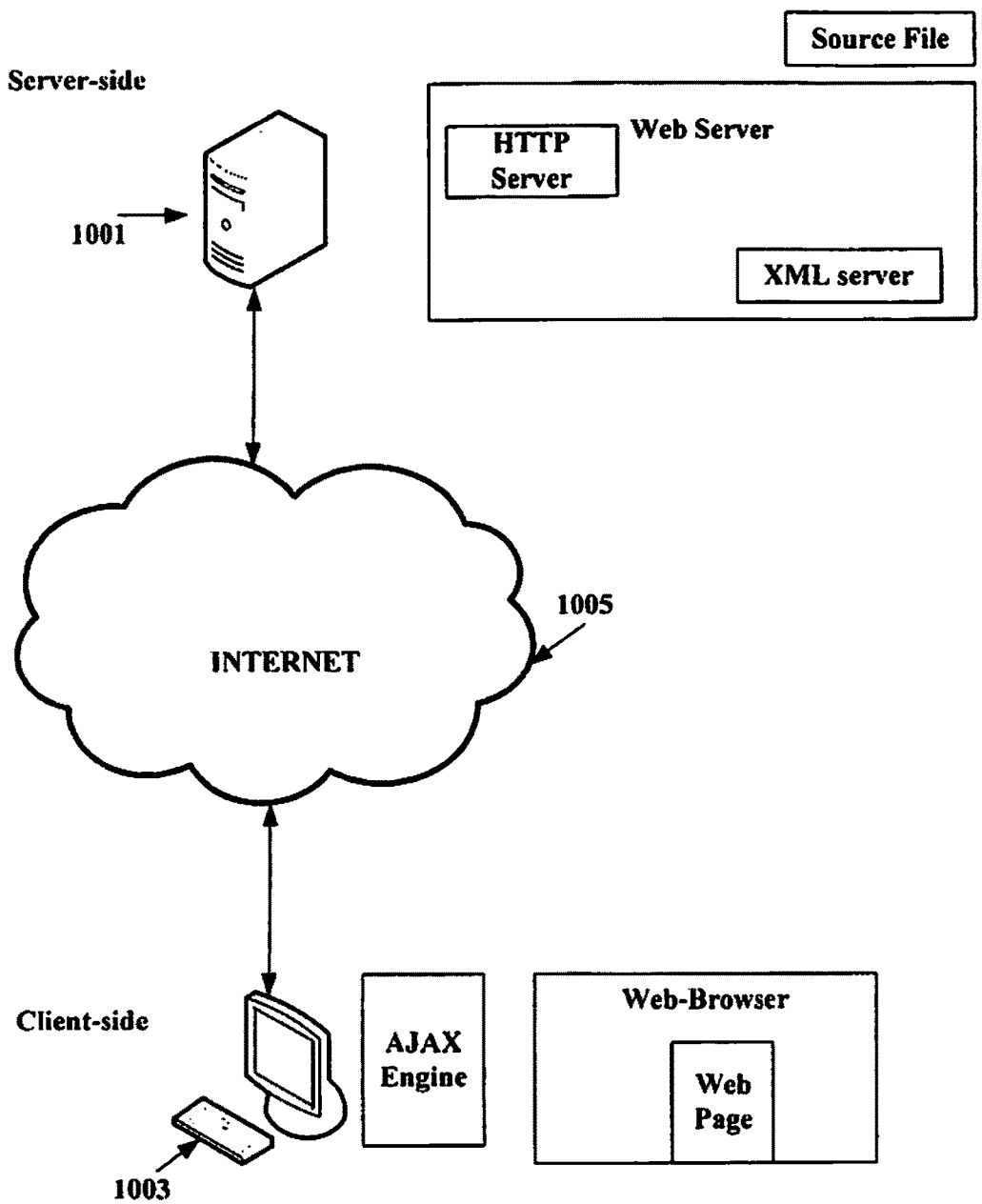
FIG. 2 is a block diagram of a web system of the prior art.
Figure 3:
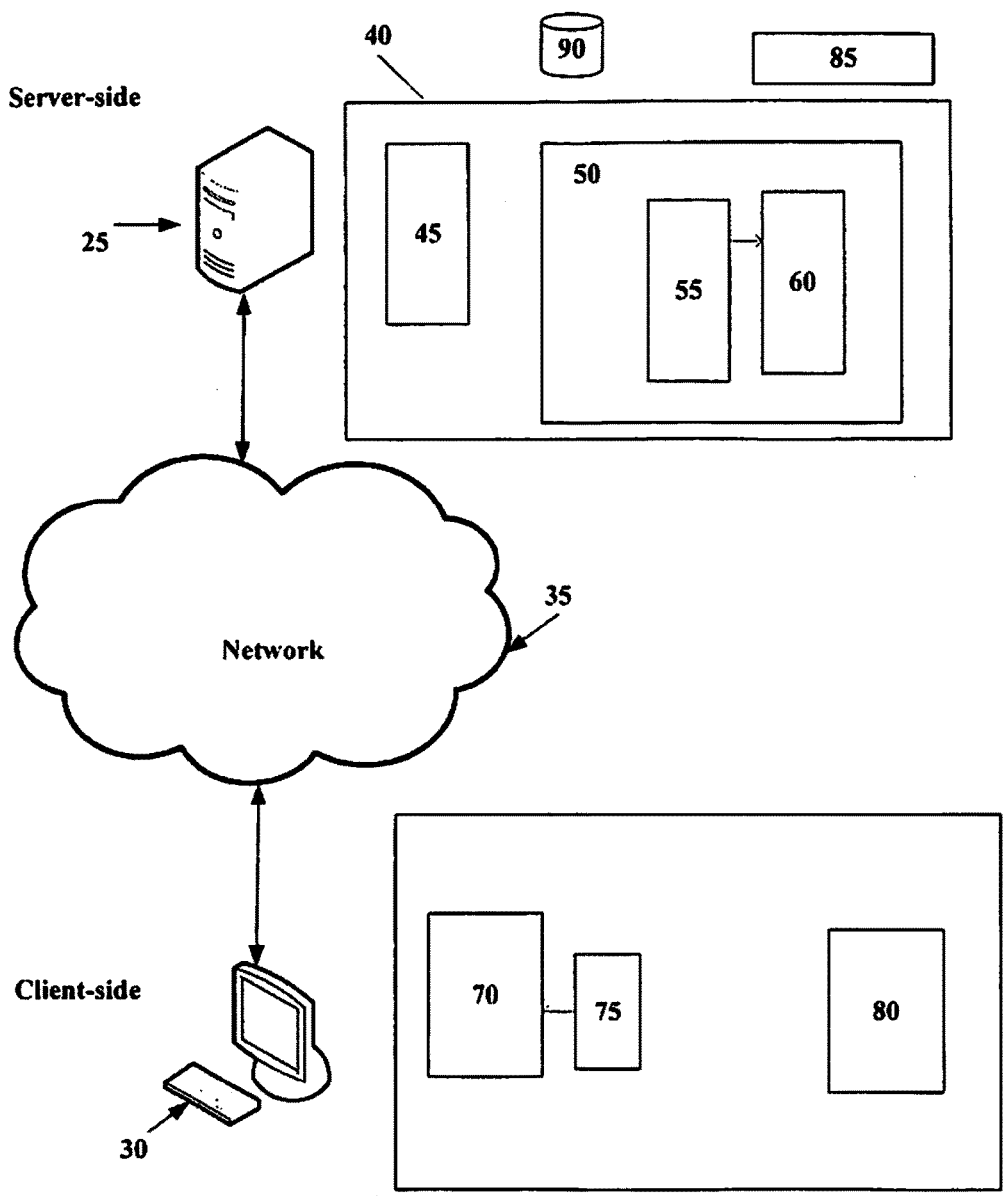
FIG. 3 is a block diagram of the system of the present invention during a callback.

As shown in FIG. 3 a system 20 of the invention generally includes a server-side 25, a client side 30 and a network or preferably the Internet 35. The server-side 25 includes a web-server 40, a handler 45 and a JavaScript server 50 preferably having a server-core 55 and a server-framework 60. The client-side 30 includes a Web-browser 65 has a client-framework 70, a client-side JavaScript code 75 and a rendering engine 80, The server-framework 60 accesses file systems 85 and databases 90, as well as the Internet 35. A more detailed description of the abilities of the running JavaScript on the server-side and client-side is disclosed in Colton et al" U.S. patent application Ser. No. 12/270,817, filed Nov. 13, 2008 (or A Web Server Based On The Same Paradigms As Web-Clients, which is hereby incorporated by reference in its entirety. An additional detail of facilitated server-side to client-side communications is disclosed in Colton et al., U.S. patent application Ser. No. 12/276,327, filed Nov. 22, 2008 for a System And Method For Facilitated Client-Side To Server-Side Communications, which is hereby incorporated by reference in its entirety.

In FIG. 3, the system 20 is shown during a callback operation. The callback begins at the client-side JavaScript code 75 with a callback request sent to the client-framework 70. A HTTP GET/request is transmitted over the Internet 35 to the server-side 25, and received at the Web-server 40. The HTTP GET/request is sent to the server-core 55 which sends the HTTP GET/request as a callback to the server-framework 60. The server-framework 60 receives the callback, deserializes, performs the get functions, invokes, serializes and sends the response to the callback to the server-core 55. The server-core 55 sends the response to the Web-server 40 which sends the response over the Internet 35 to client-framework 70 on the Web-browser 65.

Figure 4:
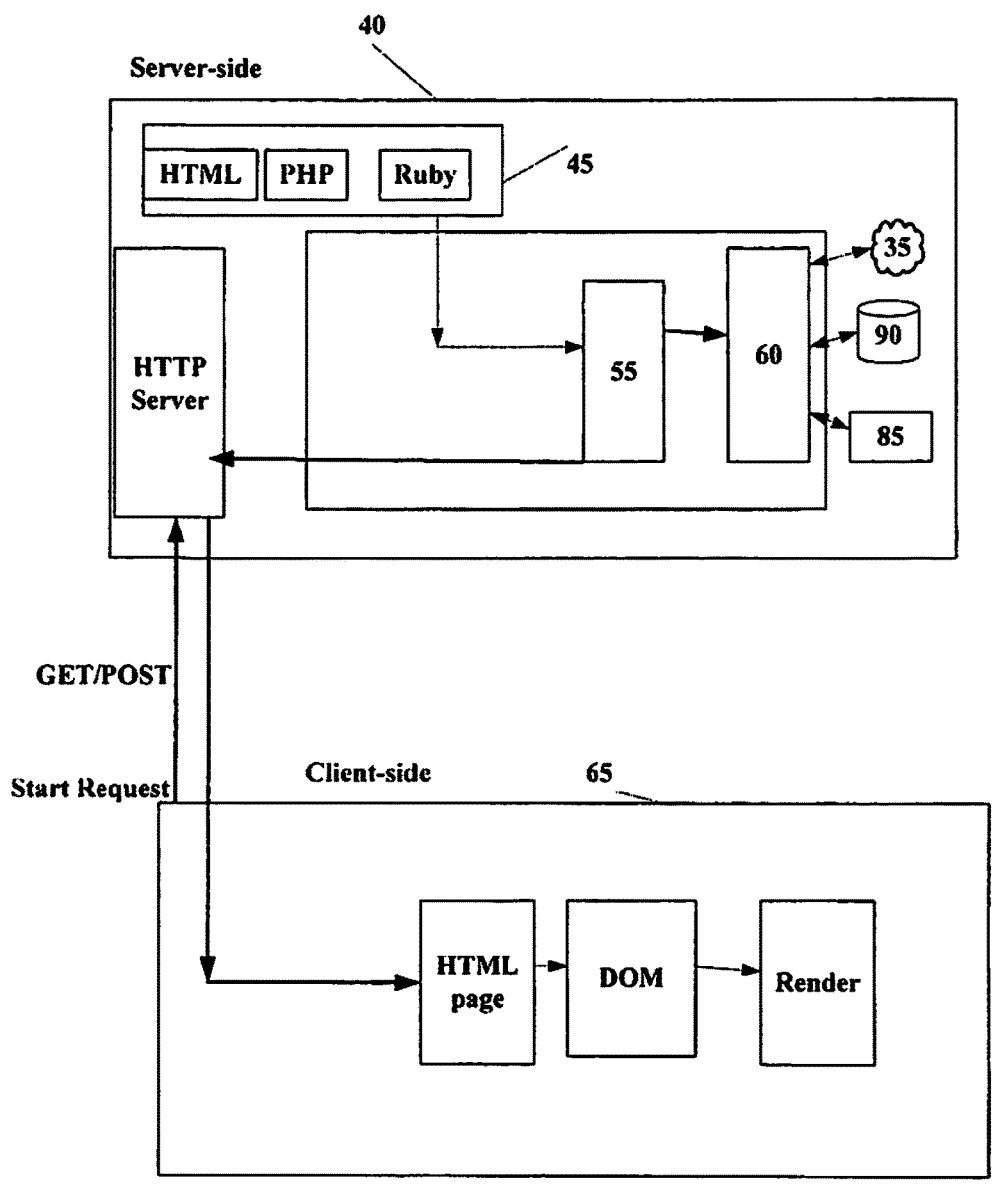
FIG. 4 is a block diagram of the system of the present invention during a normal process.
Figure 4A:
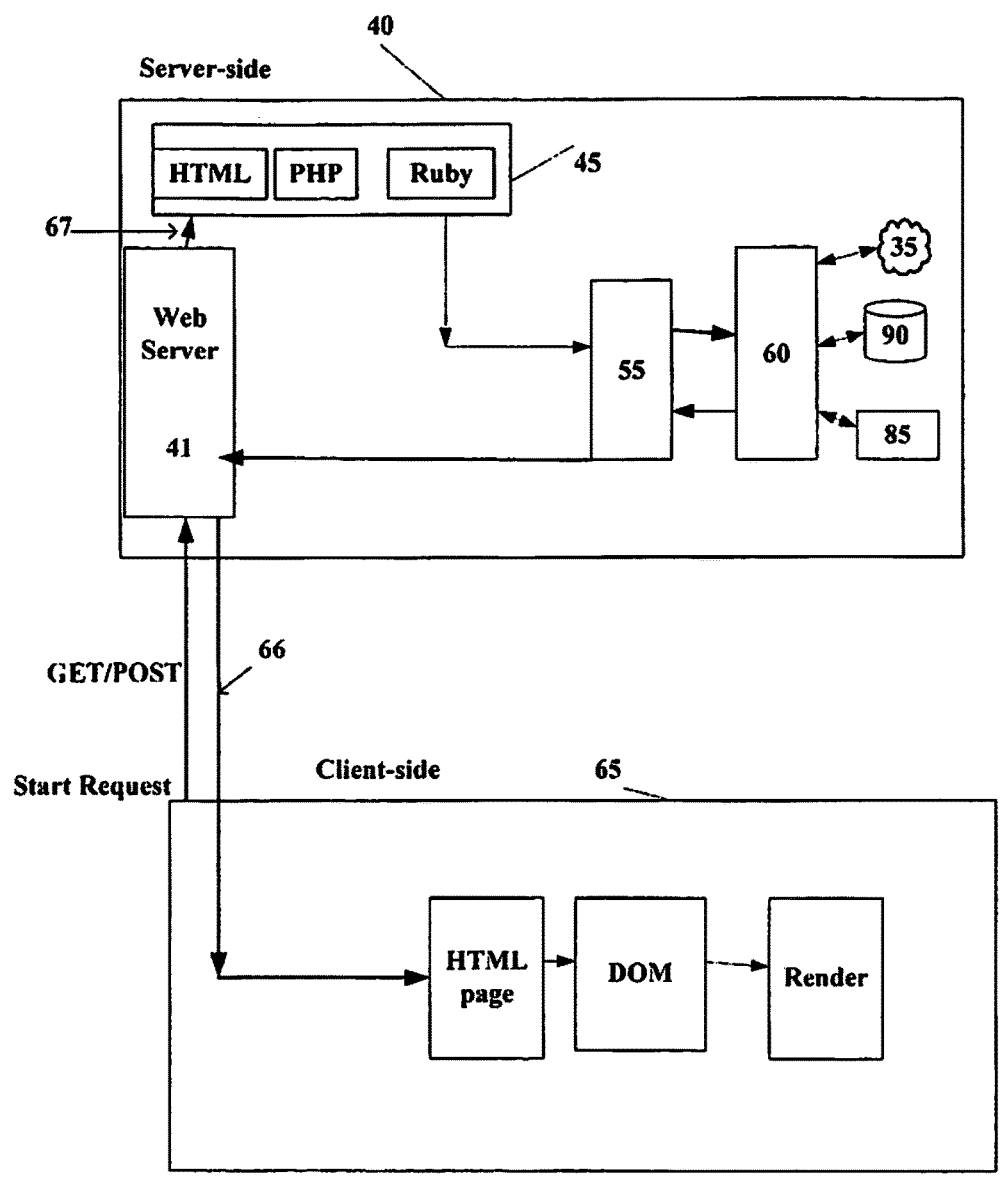
FIG. 4A is a block diagram of the system of the present invention during a normal process.

In FIG. 4, the system 20 is shown during a normal process. The process begins with a HTTP GET/request for a Web-page sent over the Internet 35 from the Web-browser 65 on the client-side 30 to the server-side 25. The HTTP Request is sent to the handler server 45. The HTML Web-page is then sent to the script server architecture 50. The server-core 55 of the script server architecture 50 parses the HTML Web-page to create a HTML DOM of the HTML Web-page. The server-core 55 also parses and interprets the JavaScript of the HTML Web-page. The server-framework 60 accesses databases 90 and filesystems 85 to respond to the Requests for the HTML Web-page. The server-framework 60 also injects proxies to modify the HTML Web-page. The server-core 55 serializes the DOM back to the HTML Web-page and the web-server 40 transmits the HTML Web-page to the client-side 30 where the Web-browser 65 renders the HTML Web-page for display for a user. As shown in FIG. 4A, a Web server (e.g., apache server) 41 receives a request from the client-side. The request 67 is sent to the handler server (PHP, Ruby or Java language) 45. The handler server 45 feeds the HTML document to script server-core 55 which begins to parse the HTML document thereby building the DOM tree for the HTML document on the server-side. Events and callbacks are sent to the script server-framework 60. The script server adds <script> tags to the DOM and executes them if the <script> has a runat attribute that indicates the <script> should be run on the server. During the parsing and execution, external content from filesystems 85, databases 90, and the like are fetched and loaded into the HTML document. After the DOM is loaded, the onserverload event is fired from the script server framework 60. The script server architecture post-processes the DOM to perform its built in logic and prepare the DOM for transmission to the client side. This post-process includes removing <script> block meant only for the server, replacing function to be proxied with proxies, saving functions that should be available as callbacks, and the like. The DOM is serialized back to HTML, and the HTML is streamed back via the web server 41 to the browser. A more detailed explanation of event-driven JavaScript architecture is set forth in Colton et al., U.S. patent application Ser. No. 12/273,539, filed on Nov. 18, 2008, for a Flexible, Event-Driven JavaScript Server Architecture, which is hereby incorporated by reference in its entirety. A more detailed explanation of on-the-fly processing is set forth in Colton et al., U.S. patent application Ser. No. 12/276,337, filed on Nov. 22, 2008, for a System And Method For On-The-Fly, Post-Processing Document Object Model Manipulation, which is hereby incorporated by reference in its entirety.

Figure 10:
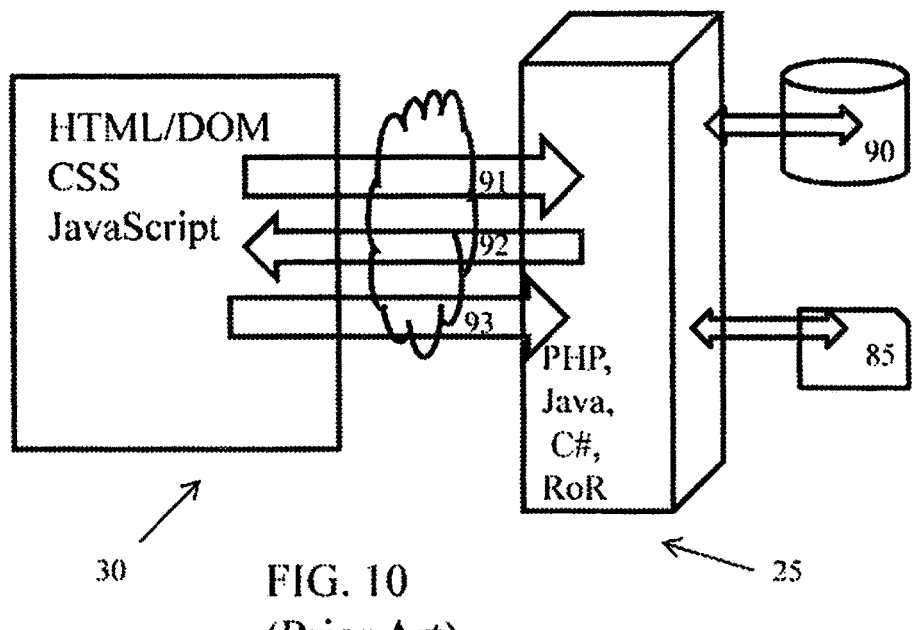
FIG. 10 is a block diagram of a prior art application stack illustrating the interactions between the client side and the server-side.
Figure 11:
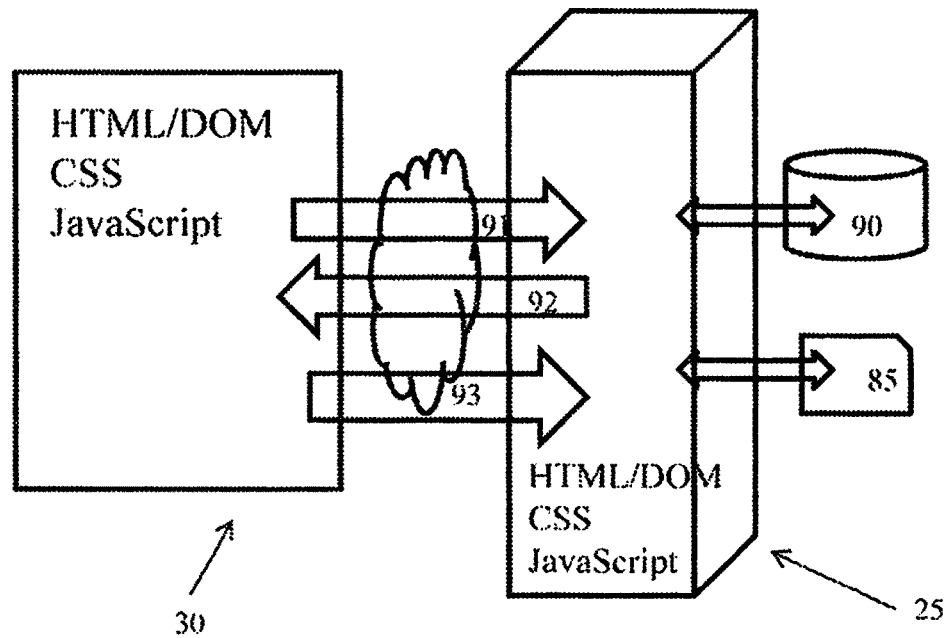
FIG. 11 is a block diagram of an application stack of the present invention illustrating the interactions between the client side and the server-side.

FIGS. 10 and 11 illustrate the difference in the application stacks between the prior art and the present invention. In both FIGS. 10 and 11, a client-side is designated 30 includes the HTML/DOM, CSS and JavaScript. In both FIGS. 10 and 11, arrow 91 is a request, arrow 92 is a response and arrow (both directions) 93 is a callback. The server-side 25 is the difference. The server-side 25 of the prior art is PHP, Java, RoR and C#. The server-side of the present invention is HTML/DOM, CSS and JavaScript. In the prior art, FIG. 10, Callbacks 93 require that the client-side 30 wrap, send, receive and unwrap the callback while the server-side 25 is required to receive, unwrap, run, wrap and send the callback. In the present invention, callbacks 93 are handled via XMLHttpRequests. When the server-side receives the request, the script-server architecture preferably creates a new, empty HTML document. The script-server architecture retrieves to this HTML document the saved functions needed to be made available during the callback. If a function designated oncallback is located, it is executed in order to create an environment needed during a callback, especially if the saved functions are not sufficient. Then, the callback function is executed and the results of the execution are packaged and returned as the response to the XMLHttpRequest.

Figure 5:
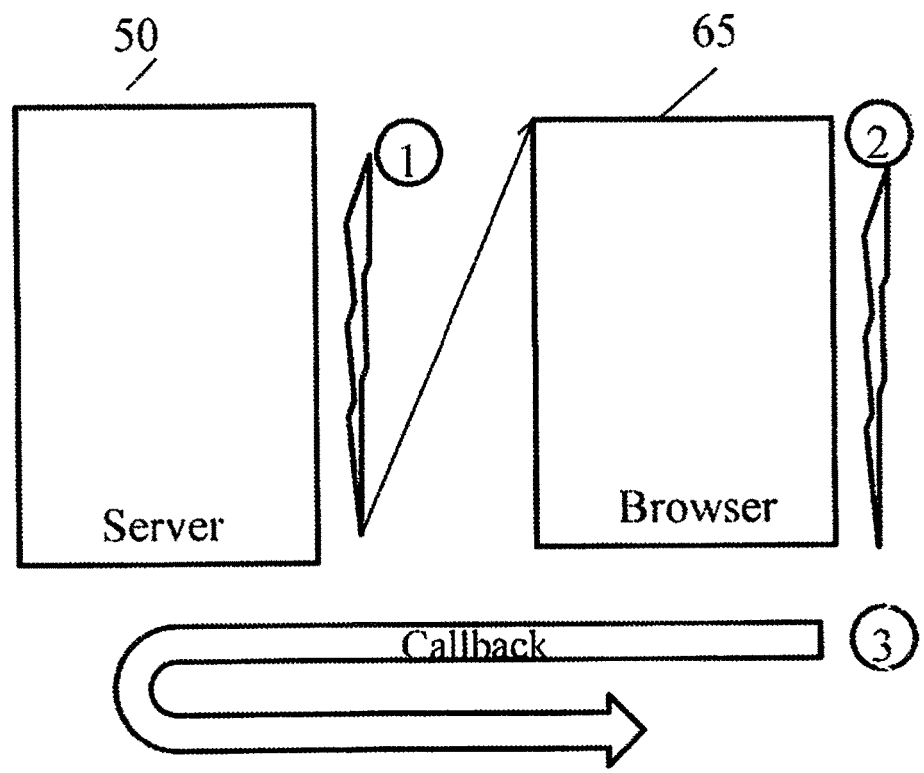
FIG. 5 is a block diagram of a callback process.

As shown in FIG. 5, the present invention allows the server 50 to execute the JavaScript functions that are set to runat="server" or runat="both". These functions might call databases, file systems, communicate across network sockets, or get session data. And since the server-side engine has a HTML DOM just like the browser, the HTML page can be manipulated through standard DOM APIs and your favorite Ajax libraries. The present invention also has session objects that can be used to persist data for users during a session or transaction. Any functions set to runat="server" are stripped from what gets sent to the browser 65. Specifically at 1, the page executes on the server 50 and a resulting HTML page is sent to the browser 65. A more detailed description of the runat function is set forth in Colton et al., U.S. patent application Ser. No. 12/270,868, filed on Nov. 14, 2008, for a System And Method For Tagging Code To Determine Where The Code Runs, which is hereby incorporated by reference in its entirety. A more detailed description of validating the code is set forth in Colton et al., U.S. patent application Ser. No. 12/232,5239, filed on Nov. 30, 2008, for a Client-Side And Server-Side Unified Validation, which is hereby incorporated by reference in its entirety.

After server 50 sends the resulting HTML page to the browser 65, at 2 the browser 65 interprets the HTML page and executes the JavaScript within the HTML page. If JavaScript functions tagged to runat="server-proxy" are included, then the present invention automatically strips out the bodies of those functions and replaces the bodies with a new functions by the same name that know how to invoke the original function on the server 50 using Ajax calls and return the result either synchronously or asynchronously. Ajax communications do not need to be written using the present invention. Any functions not tagged with a runat attribute or set to runat="client" or runat="both" are processed by the browser 65.

Any functions set to runat="server-proxy" can now be called from the browser 65. The function is called as if it were running on the browser 65, and the present invention, automatically via XHR communications with the server 50, marshals the parameters to the server 50 where the function executes (calling databases, getting info from the session data, etc. . . . ) and returns the result to the browser 65. The "server-proxy" functions can be invoked either synchronously or asynchronously. At 3, the browser 65 calls the server 50 asynchronously for new information.

The server computer program of the present invention is pre-configured for preferable use as a plug-in to the APACHE 2.x web server. To provide standards-compliant JavaScript and DOM capabilities server-side, the server computer program is built on the MOZILLA engine, which is the same engine used in the popular FIREFOX browser. The server computer program of the present invention is layered into APACHE as an input and output filter for use to modify dynamic pages created by other languages, such as PHP or Ruby.

The client-side preferably has a user interface. The user interface (also referred to as UI) is typically a computer which includes a processing means for interacting with various input and output devices ("I/O devices"), and various networks. The I/O Devices can be drives, a keyboard, a display, a scanner, a mouse and the like. The processing means typically includes a CPU such as an INTEL PENTIUM™ processor or the like. The processing means also preferably includes a memory (random access memory and read only memory) and interfaces for communicating with networks and the I/O Devices. The computers on the server-side are similar to the client-side, however more powerful.

The server computer program of the present invention is preferably a combination of C/C++ "Core" code and a server-side JavaScript "Framework." The server-core 55 provides the JavaScript parser and runtime, HTML parser and DOM engine, and an event architecture that calls the server-framework 60 as the document is being processed on the server-side 25. The server-framework 60 provides the logic, for example deciding which code to run on the server-side 25 and which on the client-side 30, creating proxies on the client-side 30 for callable server-side functions, serializing and deserializing data, and other related activities. A more detailed description of generating proxies is set forth in Colton et al., U.S. patent application Ser. No. 12/275,182, filed on Nov. 20, 2008, for a System And Method For Auto-Generating JavaScript Proxies And Meta-Proxies, which is hereby incorporated by reference in its entirety. Further discussions on proxy generation are set forth in Colton et al., U.S. patent application Ser. No. 12/275,213, filed on Nov. 20, 2008, for a Single Proxy Generation For Multiple Web Pages, which is hereby incorporated by reference in its entirety. A more detailed description of accessing the DOM on the server-side is set forth in Colton et al., U.S. patent application Ser. No. 12/277,336, filed on Nov. 22, 2008, for a System And Method For Accessibility Of Document On the server side 25, a developer's JavaScript environment is enhanced by the server-framework 60, which provides access to the database (e.g., MySQL), file system, network, the HTTP Request and Response data, and the external server-side platforms such as Java, PHP, and Ruby. The script server architecture 50 allows for processing of web applications on-the-fly. An additional explanation of on-the-fly post processing is disclosed in Colton et al., U.S. patent application Ser. No. 12/325,240, filed on Nov. 30, 2008, for On-The-Fly, Post-Processing Of HTML Streams, which is hereby incorporated by reference in its entirety. Further details are provided in Colton et al., U.S. patent application Ser. No. 12/325,249, filed on Nov. 30, 2008, for On-The-Fly, Rewriting Of Uniform Resource Locators In A Web-Page, which is hereby incorporated by reference in its entirety. Yet further details are provided in Colton et al., U.S. patent application Ser. No. 12/326,035, filed on Dec. 1, 2008, for On-The-Fly Optimization Of Web-Applications, which is hereby incorporated by reference in its entirety. Yet further details are provided in Colton et al., U.S. patent application Ser. No. 12/326,087, filed on Dec. 1, 2008, for On-The-Fly Instrumentation Of Web-Applications, Web-Pages or Web-Sites, which is hereby incorporated by reference in its entirety.

An example of code written by a developer and prior to processing by the present invention is set forth below.

```
<html>
  <head>
    <title>Tasks</title>
    <style>
      body {font: 9pt Arial; float: left;}
      .tasks {background-color: #f0f0ff; padding: 8px;}
      .new-task {Padding-bottom: 8px;}
      .task {Padding: 4px;}
    </style>
    <script type="text/javascript" runat="server">
      Var sql="CREATE TABLE IF NOT EXISTS tasks ("+
        "id int (11) NOT NULL,"+
        "description varchar (255),"+
        "created datetime NOT NULL"+
        ") ENGINE=InnoDB DEFAULT CHARSET=utf8;
      Aptana.DB.execute(sql);
      Window.onserverload=function( )
      {
        var resultSet=Aptana.DB.execute("SELECT * FROM
          tasks ORDER BY created");
      for (var i=0; i<resultSet.rows.length; i++)
      {
        var task=resultSet.rows[i];
        addTask(task.description, task.id);
      }
      }
      function saveTask(id, description)
      {
      var resultSet=Aptana.DB.execute("SELECT * FROM
        tasks WHERE id=?", [id]);
      if (resultSet.rows.length>0) II task already exists
      {
        Aptana.DB.execute("UPDATE tasks SET description=? WHERE id=?",
          [description, id]);
        {
        else II insert new task
        }
          Aptana.DB.execute("INSERT INTO tasks (id,
            description, created)"+
            "VALUES (?, ?, NOW( ))",
            [id, description]);
        }
      {
      saveTask.proxy=true;
      function $(id) {return document.getElementById(id);}
      $.runat="both";
      function addTask(description, id)
      {
        var newId=id||Math.ceil(1000000000*Math.random( ));
        var div=document.createElement("div");
        div.id="task_"+newId;
        div.className="task";
        var checkbox=document.createElement("input");
        checkbox.setAttribute("type", "checkbox");
        checkbox.setAttribute("title", "done");
        checkbox.setAttribute("id", "checkbox_"+newId);
        Aptana.setEvent(checkbox, "onclick", "completeTask
          ("+newId+")");
        div.appendChild(checkbox);
        var input=document.createElement("input");
        input.setAttribute("type", "text");
        input.setAttribute("size", "60");
        input.setAttribute("title", "description");
        input.setAttributc("id", "input_"+newId);
        input.setAttribute("value", description);
        Aptana.setEvent(input, "onchange", "saveTask("+
          newId+", this.value)");
        div.appendChild(input);
        $("tasks").insertBefore(div, S("tasks").firstChild);
        if (!Aptana.isOnServer)
        {
          saveTask(newId, description);
        }
      }
      addTask.runat="both";
      function completeTask(taskId)
      {
        var div=$("task_"+taskId);
        div.parentNode.removeChild(div);
        deleteSavedTask(taskId);
      {
      completeTask.runat="client";
      function deleteSavedTask(id)
      {
        Aptana.DB.execute("DELETE FROM tasks WHERE
          id=?", [id]);
        {
      deleteSavedTask.proxy=true;
    </script>
  <head>
  <body>
    <h2>Tasks To Do</h2>
    <div><i>Any changes should be automatically saved to
      your database!<i><br/><br/></div>
    <div class="new-task">
      New:
      <input type="text" id="txt_new" size="60">
      <input type="button" value="add"
    onclick="addTask($('txt_new').value)">
    </div>
    <div id="tasks" class="tasks">
    </div>
  </body>
</html>
```

Processing of the code by the present invention results in the code being formatted as set forth below:

```
<html>
  <head>
    <script src="/aptandframework.js?version=0.1.1.759"
      type="text/javascript"></script>
    <script type="text/javascript">Aptana.clientData=
      Aptana.Serialization.fromJSONString('{ }');</script>
    <script type="text/javascript">Aptana.Callback.id=-
      1407728339;</script>
    <title>Tasks</title>
    <style>
    body
      font: 9pt Arial;
      float: left;
    }
    .tasks
      background-color: #f0f0ff;
      padding: 8px;
    {
    .new-task {
      padding-bottom: 8px;
    }
```

```
.task
   padding: 4px;
}
</style>
<script type="text/javascript">
function $(id)
{
   return document.getElementById(id);
}
function addTask(description, id)
{
   var  newId=id||Math.ceil(1000000000*Math.random(
      ));
   var div=document.createElement("div");
   div.id="task_"+newId;
   div.className="task";
   var checkbox=document.createElement("input");
   checkbox.setAttribute("type", "checkbox");
   checkbox.setAttribute("title", "done");
   checkbox.setAttribute("id", "checkbox_"+newId);
   Aptana.setEvent(checkbox, "onclick", "completeTask
      ("+newId+")");
   div.appendChild(checkbox);
   var input=document.createElement("input");
   input.setAttribute("type", "text");
   input.setAttribute("size", "60");
   input.setAttribute("title", "description");
   input.setAttribute("id", "input_"+newId);
   input.setAttribute("value", description);
   Aptana.setEvent(input,  "onchange",  "saveTask("+
      newId+", this.value)");
   div.appendChild(input);
   $("tasks").insertBefore(div, $("tasks").firstChild);
   if (!Aptana.isOnServer)
   {
      saveTask(newId, description);
   {
}
function completeTask(taskId)
{
   var div=$("task_"+taskId);
   div.parentNode.removeChild(div);
   deleteSavedTask(taskId);
}
function saveTask( )
{
   return      Aptana.CallbackinvokeFunction.call(null,
      "saveTask", arguments);
}
function saveTaskAsync(callback)
{
return   Aptana.Callback.invokeFunctionAsync.call(null,
   callback, "saveTask", arguments);
}
function deleteSavedTask( )
{
return Aptana.Callback.invokeFunction.call(null, "delete-
   SavedTask", arguments);
}
function deleteSavedTaskAsync(callback)
{
   return   Aptana.Callback.invokeFunctionAsync.call(null,
      callback, "deleteSavedTask", arguments);
}
</script>
</head>
<body>
<h2>Tasks To Do</h2>
<div>
<i>Any changes should be automatically saved to your
   database!</i>
<br>
<br>
</div>
<div class="new-task">
New:<input id="txt_new" size="60" type="text"><input
   value="add"
onclick="addTask($('txt_new').value)" type="button">
</div>
<div id="tasks" class="tasks">
</div>
</body>
</html>
```

Figure 6:
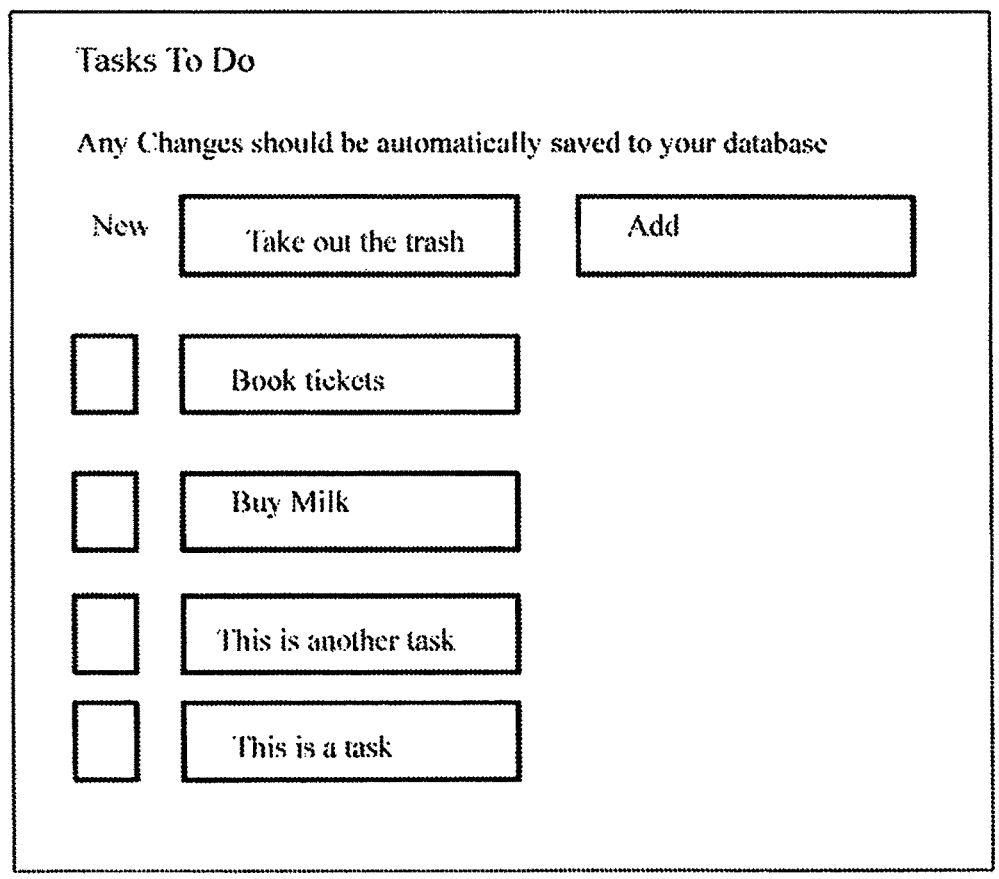
FIG. 6 is a Web-page generated by the code.

FIG. 6 is a screen display 99 of the code set forth above.

Figure 7:
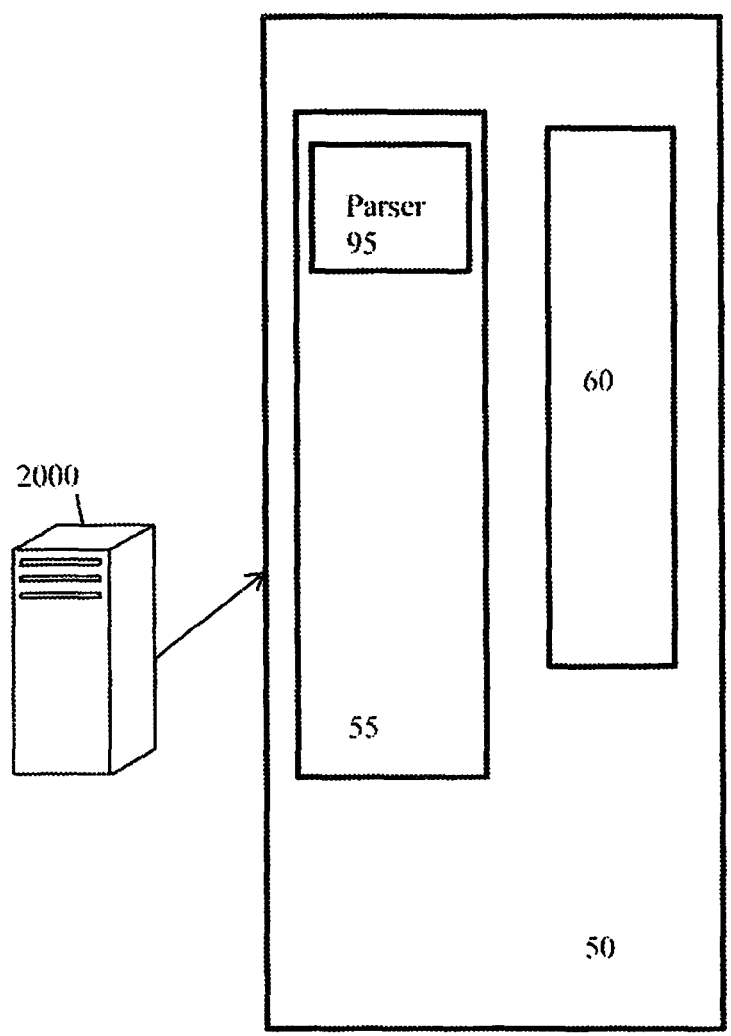
FIG. 7 is a block diagram of the server of the system of the present invention.

As shown in FIG. 7, a server-computer 2000 contains server architecture 50. The server-architecture 50 includes the server-core 55 and the server-framework 60. The server-core 55 includes a JavaScript parser 95. The server-computer 2000 is preferably a conventional server-computer available from IBM, HP, APPLE, DELL, and SUN.

Figure 7A:
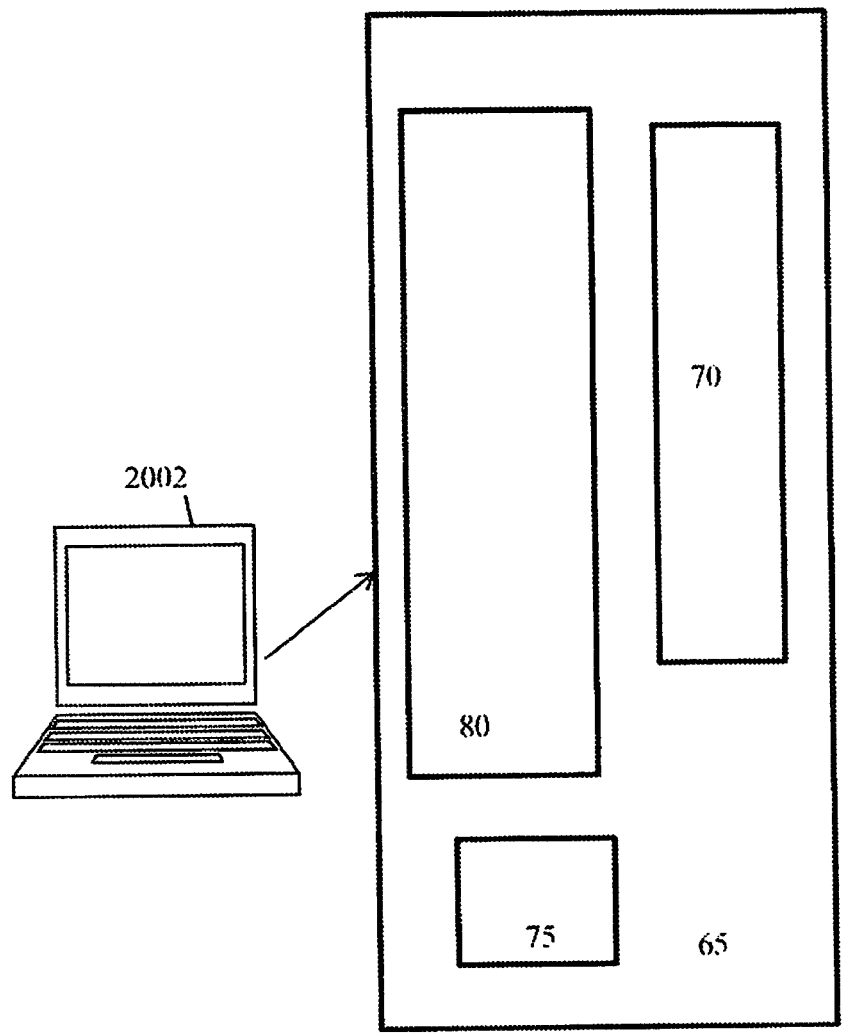
FIG. 7A is a block diagram of the user-computer of the system of the present invention.

As shown in FIG. 7A, a user-computer 2002 contains a Web-browser 65. The Web-browser 65 preferably includes the client framework 70, client-side JavaScript code 75 and the rendering engine 80. The user-computer 2002 is preferably a conventional user-computer such as a PC available from HP, DELL, and GATEWAY, or a MAC available from APPLE. The Web-browser 65 is preferably MICROSOFT INTERNET EXPLORER, NETSCAPE, APPLE SAFARI, MOZILLA FIREFOX, or OPERA.

Figure 8:
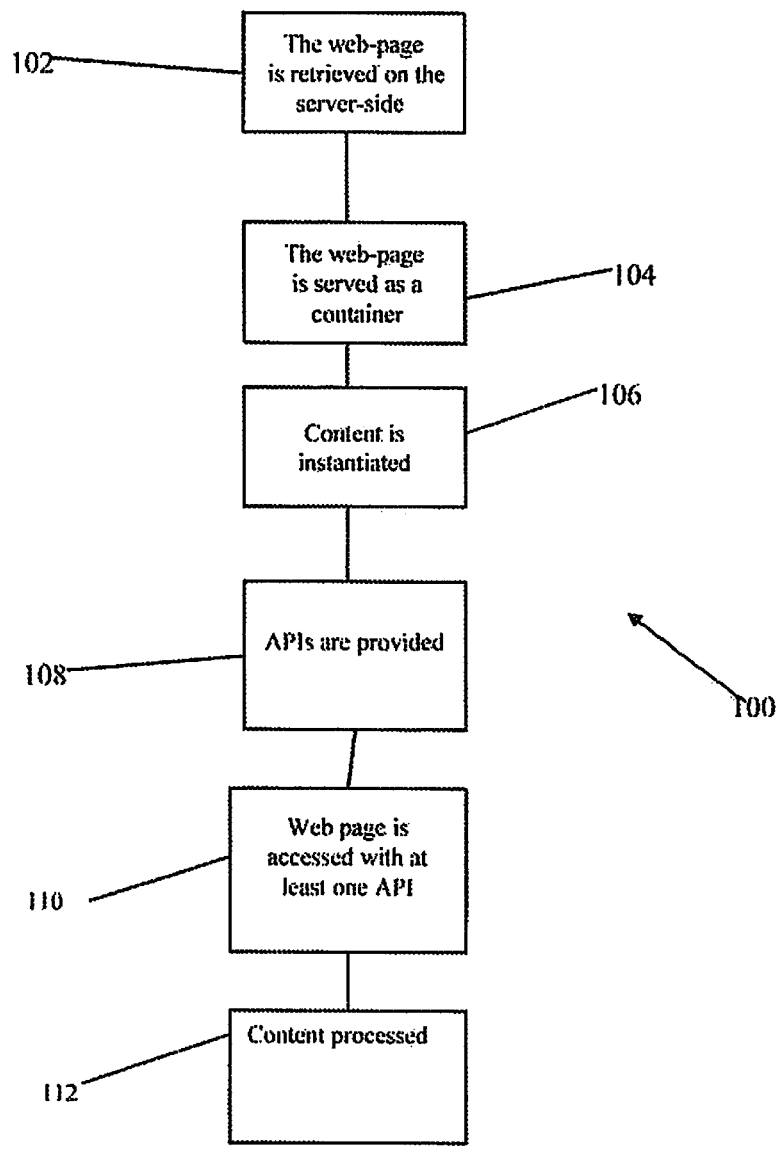
FIG. 8 is a flow chart of a general method of the present invention.

A general method 100 of the present invention is shown in FIG. 8. At block 102, a web-page of a rich web site application is retrieved on a server-side. At block 104, the web-page is served as a container. At block 106, content of the web-page is instantiated on the server-side with a plurality of JavaScript calls or a plurality of AJAX calls. At block 108, a plurality of APIs for a server-side software are provided to access and retrieve information of the web-page. At block 110, the content of the web-page is accessed with a server-side software of at least one of the plurality of APIs. At block 112, the content of the web-page is processed.

Figure 9:
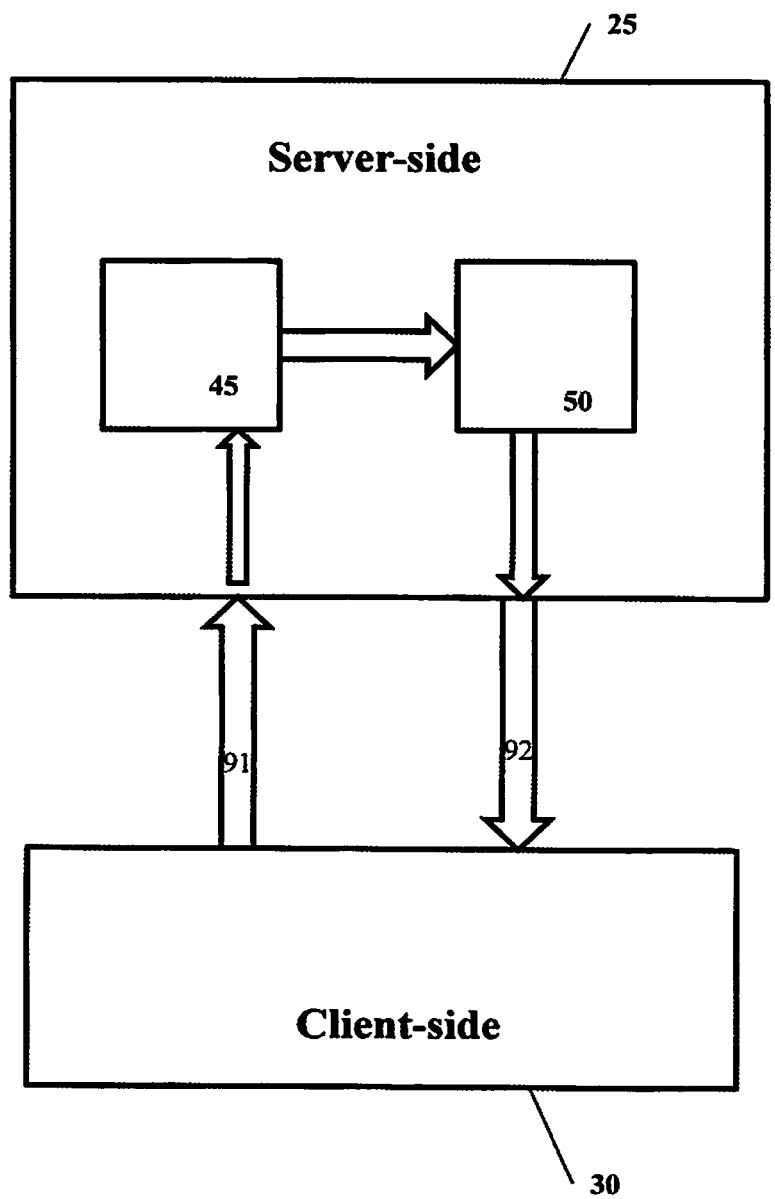
FIG. 9 is a flow chart of a more specific method of the present invention.

FIG. 9 illustrates a flow of requests and responses utilizing the present invention. A request 91 is transmitted from a client-side 30. The request 91 is preferably for an HTML document comprising a plurality of hyperlinks or pseudo-hyperlinks (JavaScript event handlers that cause link-like behavior). The plurality of hyperlinks and/or pseudo-hyperlinks are either long, present in multiple pages of a Web-Application, pertain to a server under a heavy load and/or pertain to a file or site with a security concern. The request 91 is sent to a server-side 25 and sent to an application server 45. The application server 45 transmits a response to the client-side 30 through a script server architecture 50. The script server architecture 50, on-the-fly, processes the HTML document before the response 92 is sent to the client-side/browser 30. The processing at the script server architecture 50 comprises shortening the hyperlink, or pseudo-hyperlink, shifting the load to a different server, rerouting because of a security concern, and/or generally optimizing the hyperlink. The processing is accomplished without altering the original Web-application maintained at the application server 45. An additional explanation of on-the-fly post processing is disclosed in Colton et al., U.S. patent application Ser. No. 12/325,240, filed on Nov. 30, 2008, for On-The-Fly, Post-Processing Of HTML Streams, which is hereby incorporated by reference in its entirety.

When the present invention first processes a page, before sending it to the client, it executes any JavaScript code designated to run at the server: specifically, any script blocks with a runat attribute of "server", "both", or one of their variants. Some of the functions defined during the processing can be designated to be available for callbacks. These functions are only available for callbacks from this page. A function is designated as callable from the browser it is in a script block with a runat="server-proxy" attribute, or if it has a "proxy" property with a value of true, or if it's included in the Jaxer.proxies array in the page. If any of these holds, the function is cached (saved) on the server at the end of page processing, and in its place a proxy function with the same name is injected into the browser-bound page. When the proxy function is called, on the browser, it makes an XMLHttpRequest back to the server, and the server retrieves the original function and executes it; then the result is returned to the browser, where it's handled as if the proxy function returned it.

In the present invention, preferably there are two proxy functions injected into the browser-bound page for every callable server-side function: one with the same name as the server-side function, and one with "Async" appended to its name. The second one is used to make asynchronous calls, ones that don't freeze the browser while the request is made to the server, processed, and returned. The Async version takes an additional first argument: a function to be called when the response is received from the server. That function takes as its arguments the returned result of the server-side function. An example is as follows:

```
<script runat="server-proxy">
function getLastName(first Name)}
    var lstName=Jaxer.DB.execute(SELECT lastName
       FROM names
WHERE firstNam=?", firstName).singleResult;
    return lastName;
}
</script>
<script>
    function showFullNameNow( ) {
    var fistName=documentgetElementById("first").value;
    var lastNam=getLastName(firstName);
    show(firstName, lastName);
}
function showFullNameSoon( ) {
var firstName=document.getElementById("first").value;
getLastNameAsync(
function(lastName) {show(firstName, lastName);},// this is called when
getLastName( ) returns
    firstName);
    function show(firstName,lastName) {
    alert(firstName+" "+lastName);
}
</script>
First name: <input type="text" id="first">
<input type="button" value="Show Now" onclick="showFullNameNow( )">
<input type="button" value="Show Soon" onclick="showFullNameSoon( )">
```

Note that calling the getLastName( ) function on the server is as easy as calling any function on the browser—because there actually is a getLastName( ) function on the browser, and it's a proxy for the true getLastName( ) function on the server. Using getLastNameAsync( ) requires a bit more work restructuring code to allow for the asynchronous flow, but it often means a better user experience.

In many cases, other functions are needed on the server during a callback. For example, getLastName( ) requires certain access privileges. It needs to call a getCurrentUser( ) function and then call isAuthorized( ) on it. But getCurrentUser( ) and isAuthorized( ) should not be callable from the browser directly, e.g. for security reasons. To achieve this, the present invention automatically caches any other functions defined at the end of page processing (unless they're explicitly designated with runat="server-nocache" or runat="both-nocache"), and makes them available to other functions—but not to the browser—during a callback (the asynchronous version is omitted simplicity) as shown below.

```
<script runat="server">
    function getCurrentUser( ) {//this will be available to other functions during a callback
    return Jaxer.session.get("user");
    }
    function isAuthorized(user) {//this will be available to other functions during a callback
    return user.authorizationLevel>4;// substitute some logic here
}
function getLastName(firstName)
    var user=getCurrentUser( );
    if(!isAuthorized(user))throw "You are not authorized";
    var lastName=Jaxer.DB.execute("SELECT lastName FROM names WHERE firstName=?", firstName0.singleResult;
    return lastName;
}
getLastName.proxy=true;
</script>
<script>
    Function showFullName( ) {
    var firstName=document.getElementById("first").value;
    var lastName=getLastName(firstName);
    alert(firstName+" "+lastName);
}
</script>
First name:<input type="text" id="first">
<input type="button" onclick="showFullName( )">
```

All three server-side functions getCurrentUser( ), isAuthorized( ), and getLastName( ) are saved after the page is processed and are available during a callback; but only one, getLastName( ), is allowed to be called directly from the browser, and it can then call the others as needed. It's a good practice to limit the proxied functions to only the ones actually needed by the browser to support the user interaction flow.

To understand callbacks in even more detail, consider the page lifecycle. The script server architecture of the present invention loads the page and processes it, creating the DOM from the HTML and running the server-side JavaScript, which may create some functions and may manipulate the DOM. At the end of the page the HTML DOM is turned back into HTML, and the HTML is sent to the browser. The present invention then caches whatever functions may be required during a callback, destroys the server-side global "window" JavaScript context and all the JavaScript functions and data in it as well as the DOM, and prepares for its next request. The cached functions are saved to the database, but for efficiency they're also cached as bytecode in memory. Then on every callback, an empty "window" object with an empty DOM is made available, and the cached functions for that page are recreated in that window (using the bytecode in memory, after fetching from the database if needed). Finally, the specific function specified in the callback is executed.

As a result of this flow, the environment available during a callback isn't the same as during the initial page. Basically, just the cached functions are available. In most cases, that works well, and is highly efficient: there's no need to recreate the entire original page to call a function, no complications trying to somehow sync the DOM during the callback to the possibly-changed DOM now on the browser, and no danger that user-specific data on that page may be available to other users, etc. However, if more control is needed, e.g. to make a server-side library available, if that server-side library consisted purely of functions, it was probably automatically cached when loaded during the initial page processing, so everything will operate. But if it requires some non-function objects to be present, the functions will need to be recreated during the callback. This can be done if the library contained an external JavaScript file to load it via <script src="myLibrary.js" runat="server" autorun="true"></script>. The autorun attribute tells the present invention to automatically run this library not only on every request for this page but also on every callback on this page; for efficiency, the library is actually compiled into bytecode and stored in memory. Alternatively, a special function called oncallback can be defined in the Web-page. This special function will be executed on every callback for this Web-page, An example of code to redirect to another URL is set forth below:

```
<html>
  <head>
    <script type="text/javascript" runat="server">
      window.onserverload=function( ) {
        Jaxer.response.redirect("/login/");
      };
    </script>
  </head>
</html>
```

An example of on-the-fly, post-processing of document object model manipulation is shown below. The HTML document is as shown below.

```
<html>
  <head>
    <title>Widgets Intl</title>
  </head>
  <body>
    <h1>Widgets International</h1>
    <div id="product1">Large Widget</div>
  </body>
</html>
```

The DOM tree and its elements for the HTML document, with the omission of the whitespace nodes, is shown below.
  Element: HTML
  Element: HEAD
    Element: TITLE
      Text: "Widgets Intl"
  Element: BODY
    Element: H1
      Text: "Widgets International"
    Element: DIV;
      Attribute: "id" with value "product1"
      Text: "Large Widget"

The code of the present invention for manipulating the elements is as set forth below.
var elt=document.getElementById("product1");
  elt.setAttribute("style", "font-weight: bold");
  elt.innerHTML+="— SALE!";
The DOM tree and its elements of the HTML document after the manipulation.
  Element: HTML
  Element: HEAD
    Element: TITLE
      Text: "Widgets Intl"
  Element: BODY
    Element: H1
      Text: "Widgets International"
    Element: DIV;
      Attribute: "id" with value "product 1"
      Attribute: "style" with value "font-weight bold"
      Text: "Large Widget—SALE!"

Figure 12:
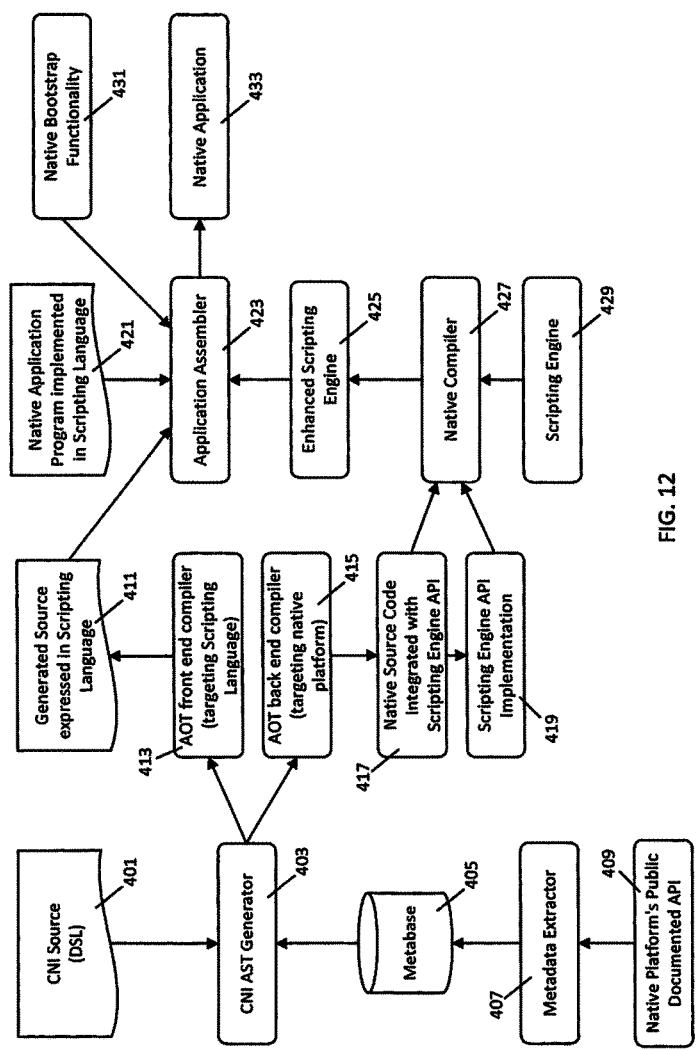
FIG. 12 is a block diagram of the system of the present invention used to automatically create native applications.

In an embodiment illustrated in FIG. 12, the present invention can automate the creation of a program, or Native Application 433, that executes on a native platform and performs functions that can include providing the native platform's functionality under the direction of source code implemented in a Scripting Language that executes in a Scripting Engine.

The functionality of the native platform provided by the Native Application 433 can be expressed in a Domain Specific Language (DSL) called Common Native Interface (CNI). The term "common" is used because the DSL uses the same language to identify native functionality from different native platforms.

A central concept of the present invention is that the full fidelity of a native platform's public documented API can be available to the Scripting Language developer so that this developer can immediately become productive by simply reading existing documentation guides for the native platform in question. By providing access to the native platform's public documented API, a Scripting Language developer may be able to implement a Native Application 433 purely in the Scripting Language. A corollary to this concept is that nothing other than a native platform's public documented API may be available to the Scripting Language. In other words, it may not be possible to access a native platform's private API from the Scripting Language.

To accomplish this, a Metadata Extractor 407 is used to construct a Metabase 405, or metadata database from a native platform's public documented API 409. A native platform's Metabase 405 contains enough metadata about the native platform's functionality to provide this functionality to a Scripting Language via a Scripting Engine's API. Examples of this metadata are class names, property names, property attributes, method names, method signatures, etc. A Metadata Extractor 407 creates and manages a native platform's Metabase 405. An important concept of the Metabase 405 is that the Metabase 405 is used only at development time and not at run time. In other words, the Metabase 405 is only used in the creation of a Native Application 433 and the Metabase 405 is not assembled with the Native Application 433.

Although a platform's Metabase 405 may provide access to all of a native platform's public documented API 409, this may not mean that all of the functionality of the native platform's public documented API 409 is made available to the Scripting Language. Instead, two other technologies called Common-Native-Interface (CNI) and Ahead-Of-Time compiling (AOT) can be used by the inventive system to selectively reduce the functionality of the native platform that is available to the Scripting Language.

A Scripting Language developer can express the native functionality required by their Native Application 433 in a Domain Specific Language (DSL) called CNI DSL. This native functionality, expressed in CNI DSL, is stored in CNI Source (DSL) 401 that is the input to the CNI AST Generator 403.

The Ahead-of-Time (AOT) front end compiler 413 identifies and transforms subgraphs of the CNI AST from the CNI AST Generator 403 and emits generated source code in the Scripting Language 411. The identified subgraphs of the CNI AST are those elements of the CNI Source 401 that have native proxies generated by the AOT back end compiler 415. The AOT front end compiler 413 is characterized as "Ahead of Time" because the compiler functions are performed before the execution of the Scripting Engine 429 embedded in the Native Application 433. The output of the AOT front end compiler 413 is valid generated source code expressed in the Scripting Language 411. This generated source code expressed in the Scripting Language 411 manipulates the native proxies (generated by the AOT back end compiler 415) as a part of the overall functionality of the Native Application 433.

The Ahead of Time (AOT) back end compiler 415 identifies and transforms subgraphs of the CNI AST and emits native source code integrated with the Scripting Engine Application Programming Interface (API) 417 to the Enhanced Scripting Engine 429. The emitted native source code integrated with the Scripting Engine API 417 identifies elements of the native platform (as specified in the CNI Source 401) and exposes this functionality to the Enhanced Scripting Engine 425 via the Scripting Engine's API 419. The identified subgraphs of the CNI AST from the CNI AST Generator 403 are those elements of the CNI Source 401 that have native proxies. The AOT back end compiler 415 is characterized as "Ahead of Time" because the compiler functions are performed before the execution of the Scripting Engine 429 embedded in the Native Application 433.

The output of the AOT back end compiler 415 is valid source code expressed in the Scripting Engine's API 419. This source code integrates all of the native functionality specified by the CNI Source 401 with the Enhanced Scripting Engine 425 (via the Scripting Engine's API 429) so that this native functionality is available to a program written in the Scripting Language that executes within the Enhanced Scripting Engine 425. The native platform's compiler 427 can include a toolchain that compiles and links this valid source code expressed in the Scripting Engine's API 419 together with the Scripting Engine 429 along with the native platform to create an enhanced Scripting Engine 425 with the native functionality specified in the CNI Source 401 such that a program written in the Scripting Language can access and interact with this native functionality when it is executed in the enhanced Scripting Engine 425.

An Application Assembler 423 can then create a Native Application 433 by assembling the Native Application Program implemented in the Scripting Language 421, the Generated Source expressed in the Scripting Language 411 (the output of the AOT front end compiler 413), the Enhanced Scripting Engine 425 and the Native Bootstrap Functionality 431.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

What is claimed is:

1. A method executed by a processor for creating a native application, the method comprising:
providing an application assembler;
providing a metadata extractor in communication with the application assembler;
constructing, during development time, a metabase from a native platform application programming interface (API) by the metadata extractor, wherein the metabase contains enough metadata about the native platform functionality to provide functionality to a scripting language;
assembling by the application assembler, the native application written purely in the scripting language from the metabase wherein a scripting engine is embedded in the native application; and
executing the scripting engine in the native application;
wherein the metabase is only used at a development time and not assembled with the native application.

2. The method of claim 1 further comprising:
providing a common-native-interface (CNI) source in communication with the application assembler, wherein the CNI source that stores a CNI domain specific language (DSL) that selectively reduces the native platform's functionality.

3. The method of claim 1 further comprising:
providing a common native interface (CNI); and
providing an ahead-of-time (AOT) front end compiler in communication with the application assembler, wherein the AOT front end compiler selectively reduces the native platform's functionality.

4. The method of claim 1 further comprising:
providing an ahead-of-time (AOT) back end compiler in communication with a scripting engine application programming interface (API).

5. A method executed by a processor for creating a native application, the method comprising:
providing a metadata extractor in communication with an application assembler;
constructing, during development time, a metabase from a native platform application programming interface (API) by the metadata extractor, wherein the metabase contains enough metadata about the native platform functionality to provide functionality to the scripting language;
providing a common native interface (CNI) and an ahead-of-time (AOT) front end compiler in communication with the application assembler;
transmitting a generated source in a scripting language from the AOT front end compiler to the application assembler;
assembling the native application from the generated source and a scripting engine; and
executing the scripting engine in the native application;
wherein the metabase is only used at a development time and not assembled with the native application.

* * * * *